United States Patent
Fukumori et al.

(10) Patent No.: US 7,051,233 B2
(45) Date of Patent: May 23, 2006

(54) METHOD FOR BACKING UP POWER SUPPLY OF DISK ARRAY DEVICE AND SYSTEM THEREOF

(75) Inventors: Mitsuo Fukumori, Kanagawa (JP); Hiroshi Suzuki, Kanagawa (JP); Hiromi Matsushige, Kanagawa (JP); Masato Ogawa, Kanagawa (JP); Tomokazu Yokoyama, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 416 days.

(21) Appl. No.: 10/427,697

(22) Filed: Apr. 29, 2003

(65) Prior Publication Data

US 2003/0217300 A1 Nov. 20, 2003

(30) Foreign Application Priority Data

Apr. 30, 2002 (JP) .............................. 2002-128591
Sep. 25, 2002 (JP) .............................. 2002-278902

(51) Int. Cl.
G06F 11/10 (2006.01)

(52) U.S. Cl. .............................. 714/14; 714/6; 714/22; 714/24; 711/114

(58) Field of Classification Search .................... 714/6, 714/14, 22, 24; 711/114
See application file for complete search history.

(56) References Cited

U.S. PATENT DOCUMENTS

| 5,379,417 | A |   | 1/1995 | Lui et al. |
| 5,488,731 | A | * | 1/1996 | Mendelsohn ................ 711/114 |
| 5,673,412 | A | * | 9/1997 | Kamo et al. ................ 711/114 |
| 5,748,874 | A | * | 5/1998 | Hicksted et al. ............. 714/24 |
| 5,828,823 | A |   | 10/1998 | Byers et al. |
| 5,889,933 | A |   | 3/1999 | Smith |
| 5,923,099 | A | * | 7/1999 | Bilir ............................. 714/14 |
| 5,954,823 | A | * | 9/1999 | Cutts et al. .................. 714/14 |
| 6,295,577 | B1 | * | 9/2001 | Anderson et al. ............. 714/14 |
| 6,295,609 | B1 | * | 9/2001 | Cargemel et al. ............. 714/6 |
| 6,438,647 | B1 |   | 8/2002 | Nielson et al. |
| 6,618,821 | B1 |   | 9/2003 | Duncan et al. |
| 6,691,248 | B1 |   | 2/2004 | Nishijima et al. |
| 6,725,397 | B1 | * | 4/2004 | Emberty et al. ............. 714/24 |
| 6,816,981 | B1 | * | 11/2004 | Morita et al. ................. 714/6 |
| 2001/0049799 | A1 |   | 12/2001 | Morita et al. |
| 2002/0007469 | A1 | * | 1/2002 | Taketa et al. ................. 714/6 |
| 2002/0069317 | A1 |   | 6/2002 | Chow et al. |
| 2003/0107906 | A1 |   | 6/2003 | Tokunaga et al. |
| 2004/0078663 | A1 | * | 4/2004 | Inaba ........................... 714/22 |

FOREIGN PATENT DOCUMENTS

| JP | 62-202228 A | 9/1987 |
| JP | 02-071347 A | 3/1990 |
| JP | 11-327811 A | 11/1999 |
| JP | 2000-194510 A | 7/2000 |

OTHER PUBLICATIONS

"Buffered Power Supply," IBM Technical Disclosure Bulletin, Aug. 1975, pp. 800-801.
"Fault-Tolerant Control for DASD Arrays," IBM Technical Disclosure Bulletin, Jun. 1995, pp. 203-206.

* cited by examiner

Primary Examiner—Robert Beausoliel
Assistant Examiner—Joseph D Manoskey
(74) Attorney, Agent, or Firm—Townsend and Townsend and Crew LLP

(57) ABSTRACT

A disk array device having two or more disk units, each disk unit including at least one disk drive, at least either of said disk units having parity bits carrying data recovery information, comprises at least one backup battery provided for each of said disk unit.

19 Claims, 14 Drawing Sheets

NORMAL STATE

→ DATA TRANSFER PATH
⋯⋯→ ABNORMAL REPORT PATH

ABNORMAL STATE OF POWER SUPPLY OF DISK DRIVE 1

METHOD FOR BACKING UP POWER SUPPLY OF DISK ARRAY DEVICE AND SYSTEM THEREOF

CROSS-REFERENCE TO RELATED APPLICATIONS

The present application claims priorities upon Japanese Patent Application No. 2002-128591 filed on Apr. 30, 2002 and Japanese Patent Application No. 2002-278902 filed on Sep. 25, 2002, which are herein incorporated by reference.

BACKGROUND OF THE INVENTION

1. Field of the Invention

The present invention is related to a method for backing up a power supply of a disk array device and a system therefor.

2. Description of the Related Art

A disk array device has now come to be in use not only in a conventional machine room of stabilized condition but also in an ordinary office environment which may sometimes suffer continuing or instantaneous power failure and the like. In particular, as the disk array device is becoming more available through downsizing and employment of open architecture in CPU, the above situation is being spread. A typical configuration of power supply in a current disk array device is illustrated in FIG. 12 for example.

A disk controller 11 (DKU) of the disk array device 10 includes an error correction group 15 having a disk unit 13 comprising one or more disk drives 12, and a disk unit 14 for parity bits containing data recovery information for the disk unit 13. The disk unit 13 is referred to as a hard disk platter (HDD-PL) in FIG. 12, which is hereinafter simply referred to as a "platter."

A DC-DC converter 16 is connected to the error correction group 15 including the plurality of platters to supply DC power output from an AC/DC converter 18 converting two systems of AC power 17 into DC power respectively. In this power supply system, a backup battery 19 is connected to the DC-DC converter 16. When either of the two AC systems fails, the backup battery 19 supplies power to the DC-DC converter 16 so as to allow the disk device to operate normally until AC power restoration.

According to nature of the disk array device, it is basic requirement to improve its availability. In this context, fault tolerance design has been introduced for hardware failure in the disk device. However, such design policy has not been fully applied to power supply for the disk array device. For example, in the above-mentioned conventional power supply system, failure of AC power is able to be backed-up by the batteries, but when the batteries themselves become inoperative due to such as failure, back up of power supply is not to be expected.

Performance of the back-up batteries is generally likely to be dependent on environmental factors such as temperature, vibration, and deterioration with time. Thus, it becomes impossible to provide sufficient power backup since the performance of the batteries is insufficient. One solution for the problem will be improvement in availability of the batteries by adopting full redundant system to the backup batteries. However, such redundant system will substantially increase initial and running costs and also cause a problem of where to equip the batteries.

Next, discussion will be given for each platter. As shown in FIG. 13, a disk array device which is also called a storage device or a disk subsystem, constituting a single platter typically comprises a disk controller and a disk drive. The disk controller receives request for data transfer from a host apparatus and perform data receiving and transmission. The disk drive including a hard disk drive (HDD) writes and reads data to/from the HDD under control of the disk controller. Additional drive is able to be provided if required to enlarge storage capacity of the disk array device.

Turning now to the disk controller, as shown in FIG. 13, the disk controller comprises a host interface control logic section, a cache memory, an interface control logic section of the HDD, power supply, and a power supply monitoring section. The host interface control logic section takes charge of interfacing between an upper or a host apparatus and perform processes such as accepting request for data transfer. The cache memory provides a temporary storage for data to be written in the disk drive which has been transferred from the host apparatus. The interface control logic section provides an interface with respect to data receiving/transmission between the HDD, i.e., writing/reading of the data to/from the HDD. The power supply generates predetermined DC output from AC input AC1 independently prepared for the disk controller, and supplies operating power to the host interface control logic section, a cache memory, and an interface control logic section of the HDD. See Japanese Patent Application Laid-open Publication No. Sho62-202228, Symbol 40 in FIG. 1, for example. The power supply monitoring section monitors conditions of external AC input and DC output from the power supply and reports the results of the monitoring to the host interface control logic section and the interface control logic section of the HDD.

Next, the disk drive will be described. As shown in FIG. 13, each disk drive comprises an interface control logic section of the HDD, an HDD and a power supply. The interface control logic section of the HDD transmits/receives data to/from the interface control logic section of the HDD at the disk controller side, and the HDD. The power supply generates predetermined DC output from AC inputs AC2 and/or AC3 independently prepared for each disk drive, and supplies operating power to the HDD and an interface control logic section of the HDD. See Japanese Patent Application Laid-open Publication No. Sho62-202228, Symbol 20 in FIG. 1, for example.

In the conventional example shown in FIG. 13, an uninterruptible power supply, hereinafter referred to as "UPS" is connected to each of the AC inputs AC1 to AC3. If the AC input is normally supplied, each UPS supplies the AC power as received to the power supply of the disk controller or the disk drive. If the AC input fails, each UPS supplies operating power from an auxiliary power supply for backup such as secondary batteries to various sections. For example, when a UPS for the disk controller detects an abnormal condition such as power failure continuing beyond one minute and determines that power is lost, the UPS reports the event to the power monitoring section of the disk controller. The interface control logic section of the HDD which was notified of the power failure by the power monitoring section controls so that the data temporarily stored in the cache memory is written into the HDD of the disk drive, thereby the data is secured when the AC input is lost. This procedure is typically called a destaging.

In the conventional example in FIG. 13, each disk drive is not provided with the power monitoring section. Therefore, a problem will arise when power failure occurs only in the disk drive but not in the disk controller.

One example of the problem is that even if power failure occurred at a certain disk drive, the disk controller is unable to detect the failure since the disk controller is unable to monitor the power condition of the disk drive.

More specifically, when data to be written into the disk drive with power failure is transferred to the disk controller from a host apparatus, the disk controller continues to accept the transferred data to be written since the disk controller is unable to monitor the power condition of the disk drive. The data to be written transferred from the host apparatus is temporarily stored in the cache memory and then transferred to the disk drive which is operating by means of auxiliary power from such as backup batteries. A problem is that the disk controller unable to detect power failure continues to transfer data to the disk drive which is operating on auxiliary power of limited capacity.

Furthermore, considering possibility of continuing data transfer, it is difficult to properly estimate the required capacity for auxiliary power supply. One approach is that time range required for power recovery is estimated first and capacity of auxiliary power supply is determined when maximum time required until the power recovery is assumed. As a result, the dimension for an auxiliary power supply must be maximum for maximum power capacity. On the other hand, if it is of higher priority to make a disk array device as a whole smaller, power capacity must be set minimum for a auxiliary power supply of, minimum dimension. In this case, it is necessary to assume minimum recovery time from power failure. In either case, it is hard to obtain proper capacity for a auxiliary power supply.

SUMMARY OF THE INVENTION

In view of the above problems, one object of the present invention is to provide a method and system for backup power supply for a disk array device which is cost-effective, suitable for downsizing, and improves fault tolerance in power supplying.

One aspect of the present invention is a disk array device having two or more disk units, each disk unit including at least one disk drive, at least either of the disk units having parity bits carrying data recovery information, comprising at least one backup battery provided for each of the disk unit.

Another aspect of the present invention is a power backup system for a disk array device, the disk array device including an error correction group containing a disk unit storing data and a disk unit storing parity bits carrying data recovery information for the disk unit, the disk unit having at least one disk drive, comprising a backup battery provided for each disk unit, a capacity of which determined according to required power for each disk unit.

Yet another aspect of the present invention is a disk array device comprising a disk controller for accepting a request for data transfer from a host apparatus and transmitting and receiving data, a disk drive writing and reading data under control of the disk controller, a power supply monitor provided for each of the disk controller and disk drives, and a backup power supply provided for each disk controller and disk driver, wherein operational power is supplied to the disk controller and the disk drive from the backup power supply according to a monitoring result of the backup power supply, the power supply monitor of each disk drive is connected to the disk controller to have a monitoring result from the power supply monitor of each disk drive received by the disk controller.

Further aspect of the present invention is a method of controlling a disk array device including a disk controller accepting data transfer request from a host apparatus to transmit/receive the data, and a disk drive writing/reading data under control of the disk controller, the respective disk controller and the disk drive having a power supply monitor and a backup power supply, comprising receiving a monitoring result from the power supply monitors of the disk controller and the disk drive respectively, having operational power supplied by the disk controller and the disk drive from the backup power supplies provided thereto respectively according to the monitoring result, and acquiring the monitoring result of the power supply monitor of the disk drive by the disk controller.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein:

FIG. 10 is a block diagram illustrating saving data into a spare disk according to yet another embodiment of the present invention.

DETAILED DESCRIPTION OF THE INVENTION

At least the following matters will be made clear by the explanation in the present specification and the description of the accompanying drawings.

FIRST EMBODIMENT OF THE INVENTION

Figure 1:
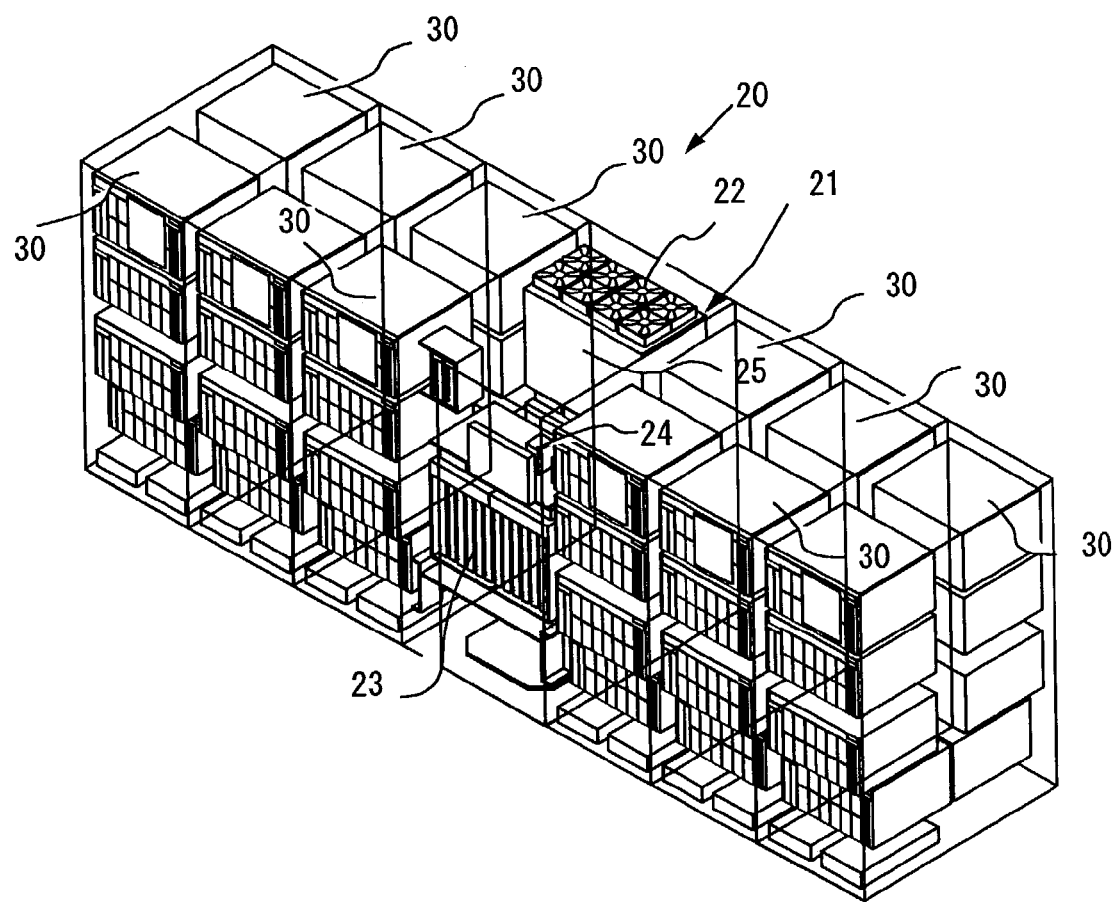
FIG. 1 is a schematic perspective view of a disk array device according to one embodiment of the present invention.
Figure 2:
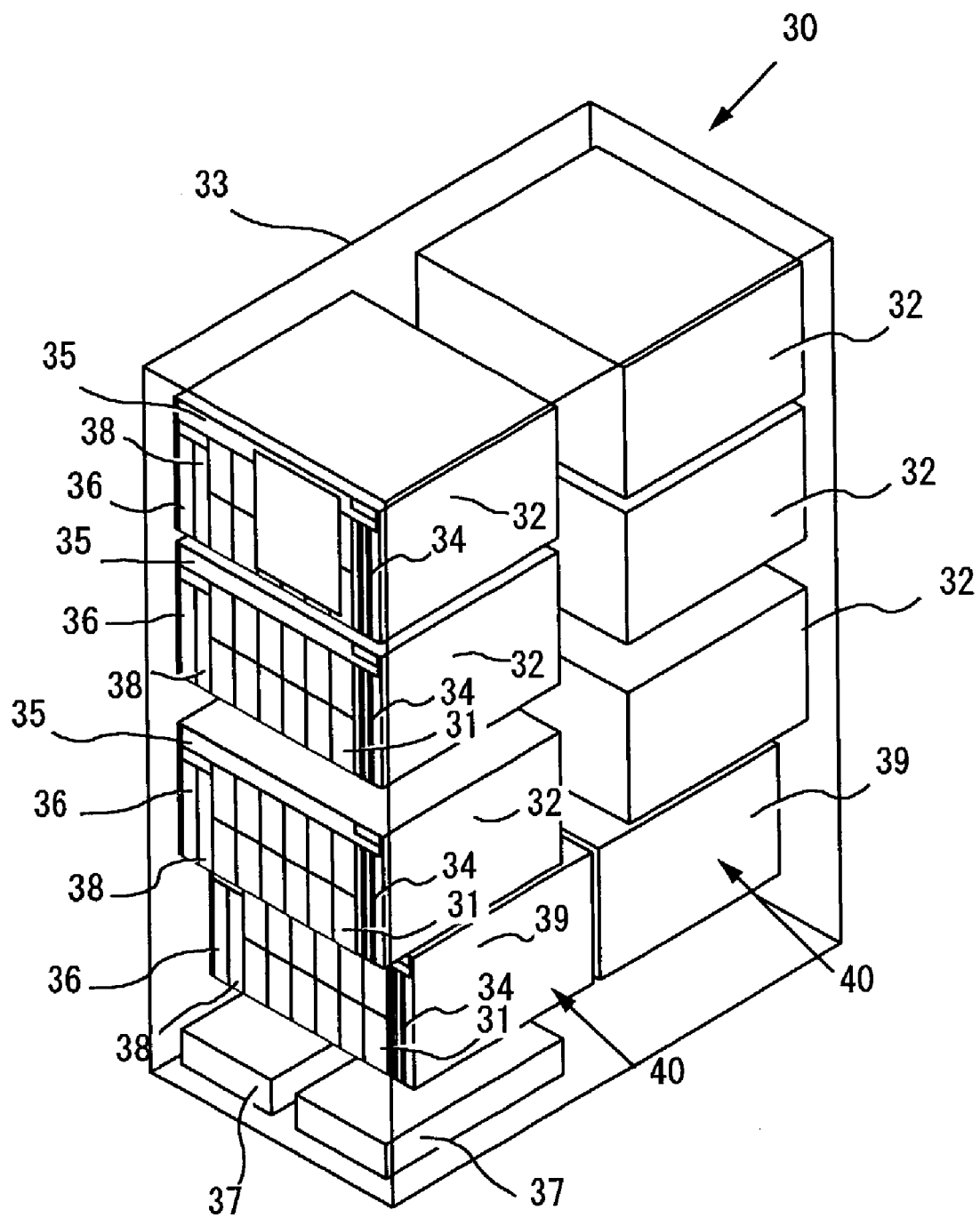
FIG. 2 is a detailed perspective view of a disk array device according to one embodiment of the present invention.

FIG. 1 shows a schematic perspective view of a disk array device 20 and FIG. 2 shows a disk subsystem 30 of the same.

First, a configuration of the disk array device 20 of the present embodiment is described in detail hereinbelow referring to the drawings. The disk array device 20 comprises a disk controller 21 and the disk subsystem 30. The disk controller 21, arranged in the middle of the disk array device 20 in FIG. 1, is comprised of a cabinet, a fan 22 for cooling the power supply, a control circuit 23 including a group of circuit boards for controlling data transfer between a host apparatus, a DC power supply 25 for supplying DC power to the control circuit 23, a breaker box 24 and the like.

The disk subsystem 30 includes a cabinet 33 containing a plurality of disk units 32, each comprising a plurality of disk drives 31. In each of the disk unit 32 are installed a plurality of canisters from the front side of the unit 32 in an attachable and detachable manner constituting a set of disk drive 31. Each canister includes an HDA (Hard Disk Assembly) and an electronic circuit for controlling the HDA. In a similar manner, one or two buffer boards 34 are installed for information transmission between the control circuit 23 and the canisters as the disk drive 31. A fan 35 is arranged above the canisters and the control circuit 23 for cooling the equipments.

Further, an AC/DC converter 36 is installed from the front side of each disk unit 32 in an attachable and detachable manner for supplying power to the canister 31, the buffer boards 34, and the fan 35. An AC power supply box 37 supplies AC power to the AC/DC converter 36. To each of the AC power supply box 37 is connected an independent power resource. For example, one AC power supply box may be connected to a commercial power source, and the other AC power supply box 37 may be connected to a power from a UPS. The power routed through the AC power supply, the AC power supply box 37 and the AC/DC converter 36 is normally supplied to the disk unit 32 and charge the batteries 38 as a backup power supply.

A capacity of the batteries 38 is determined according to power demand for each disk unit 32. In the present embodiment, the batteries 38 are provided for each disk unit 32. It is to be noted that the disk unit 32 is sometimes referred to as a hard disk platter, HDD-PL. The hard disk platter is called simply "platter" hereinbelow.

The disk subsystem 30 of the disk array device 20 comprises a cabinet containing two sets of error correction groups 40 at the front and rear part therein, each group 40 including three disk units 32 of the above-mentioned structure and a disk unit 39 for storing parity bits for data recovery information for the disk units 32.

In this disk array system, error correction code called parity is generated from the data, and the parities are distributed with the data and stored. Through this distribution of the error correction codes to the respective disks, it becomes realized that the function of an entire system is not lost even if a failure occurs to one disk. Namely, operation with the disk unit 39 for parity bits enables recovery when the data in other disk unit 32 has been damaged.

In this respect, if an independent backup battery power supply 38 is provided for each of the disk units 32, normal operation of the disk array device 20 or reservation of power required for data backup processes is achieved unless all the battery power supplies 38 are stopped. In other words, technical principle of a disk array system, "improvement in usability" is enhanced to the method of supplying backup power of the present embodiment, and consequently such a disk array device is obtained that is excellent in usability through risk management for failure of all power supplying systems.

Figure 3A:
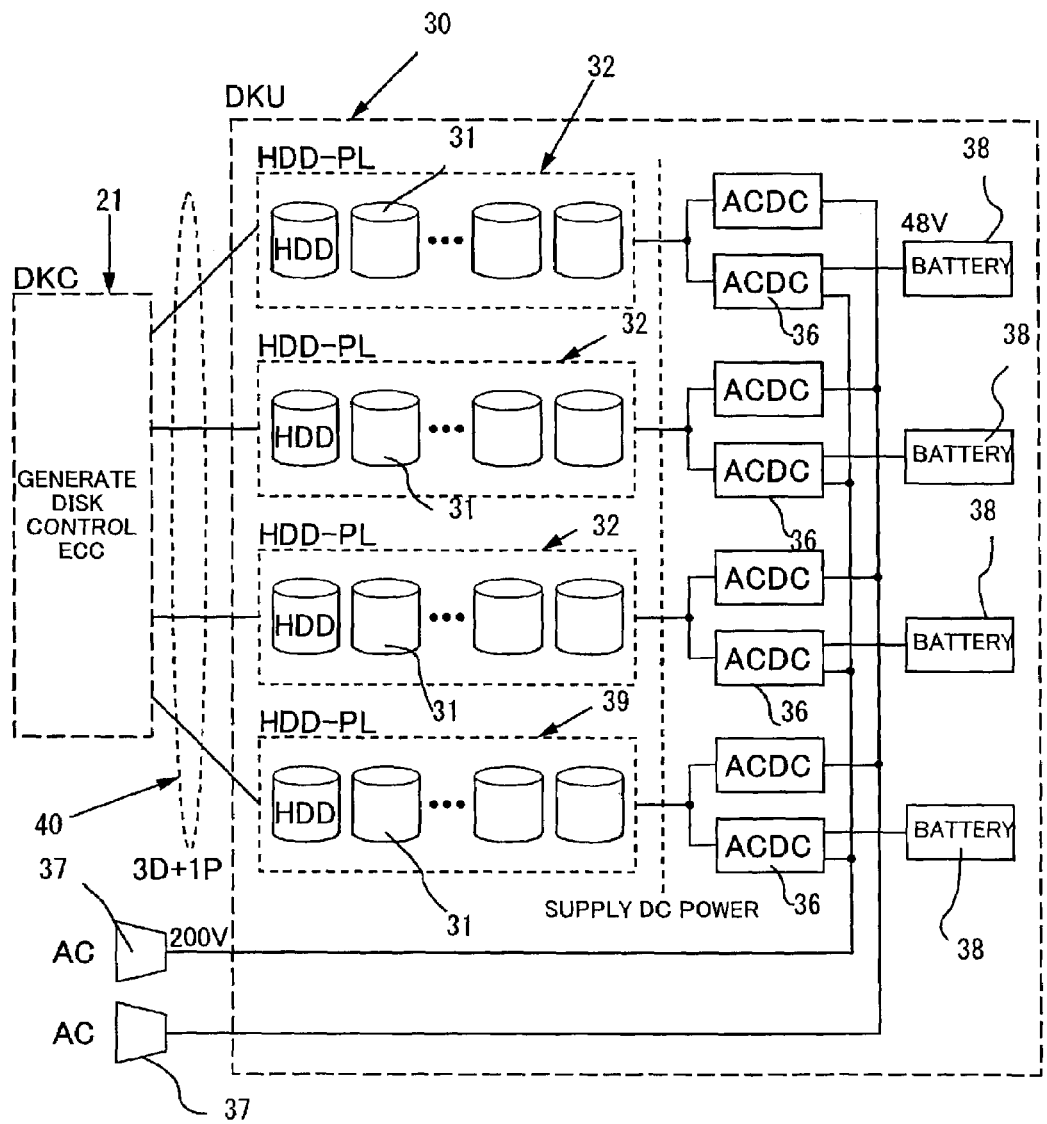
FIGS. 3A to 3D show examples of a power backup system according to one embodiment of the present invention.

FIG. 3A shows a circuit diagram of a power backup system according to the present embodiment. Three sets of the above-mentioned disk units 32 as labeled "HDD-PL" in the figure, hereinafter referred to as a "platter" and a set of disk unit 39 for containing parity bits configure an error correction group 40. The disk subsystem 30 including the error correction group 40 is controlled by the disk controller 21 and processes the data in the disk drive 31 orderly to input/output the data. It is inevitable to supply power for operation of each platter (disk unit) 32.

Figure 3B:
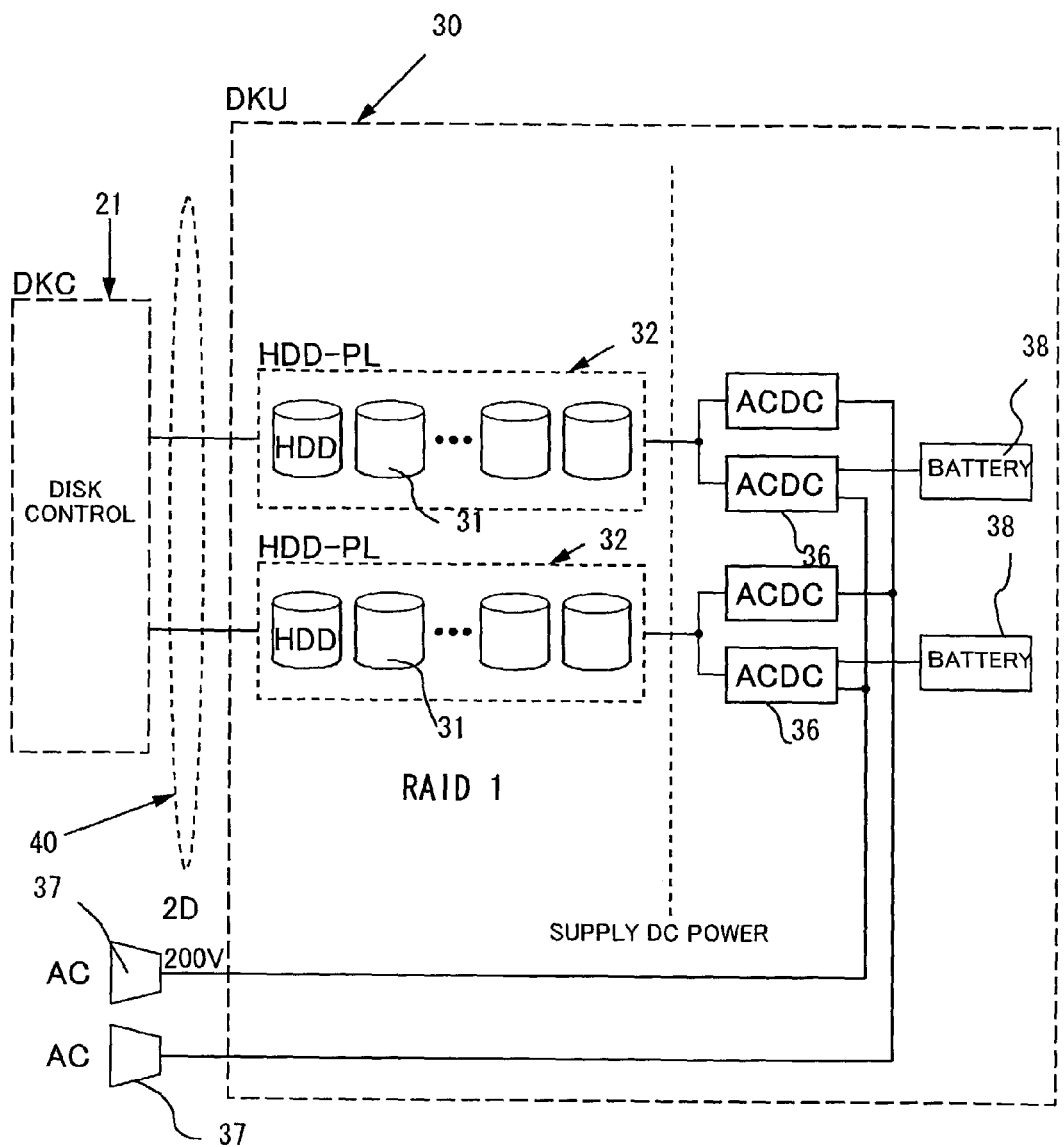
Figure 3C:
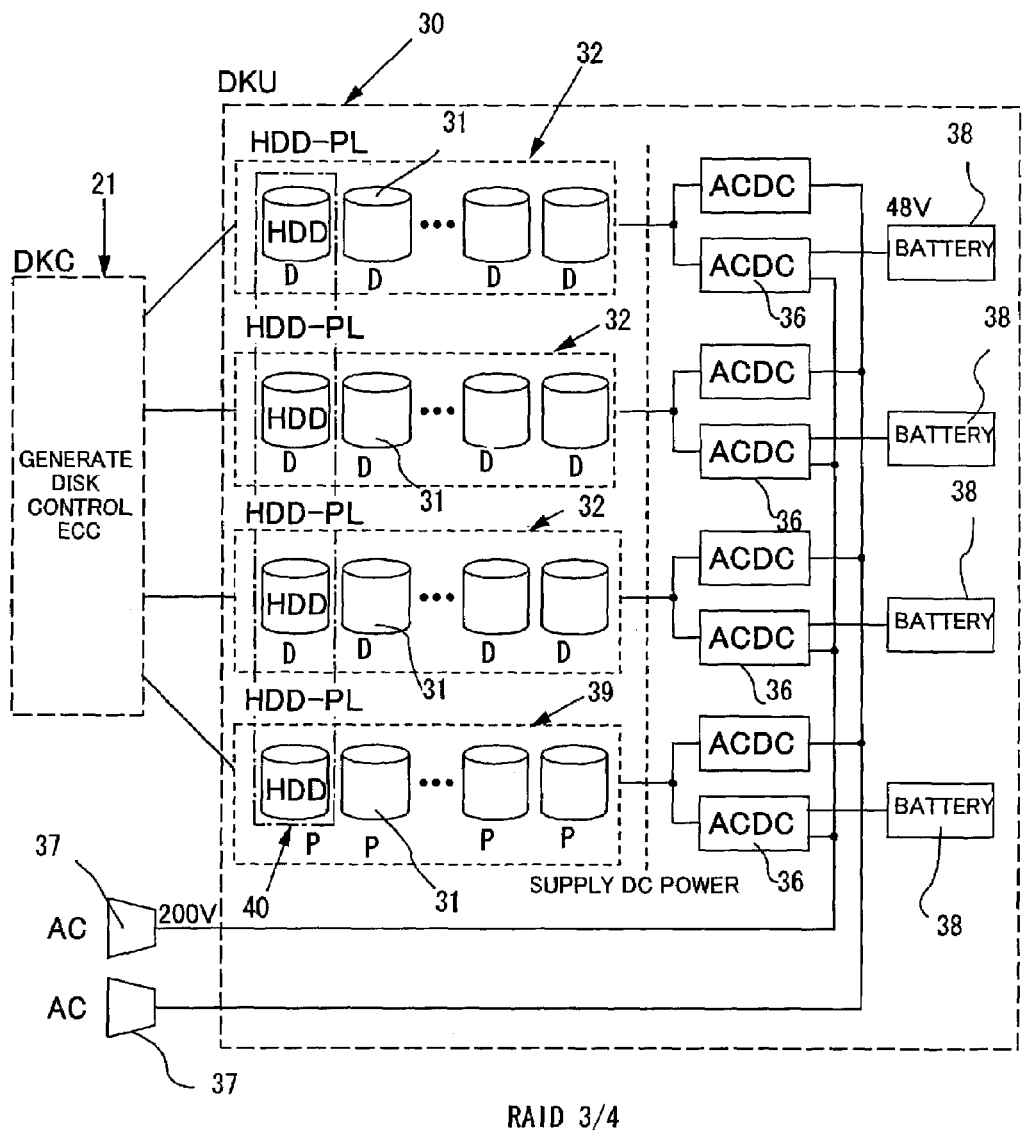
Figure 3D:
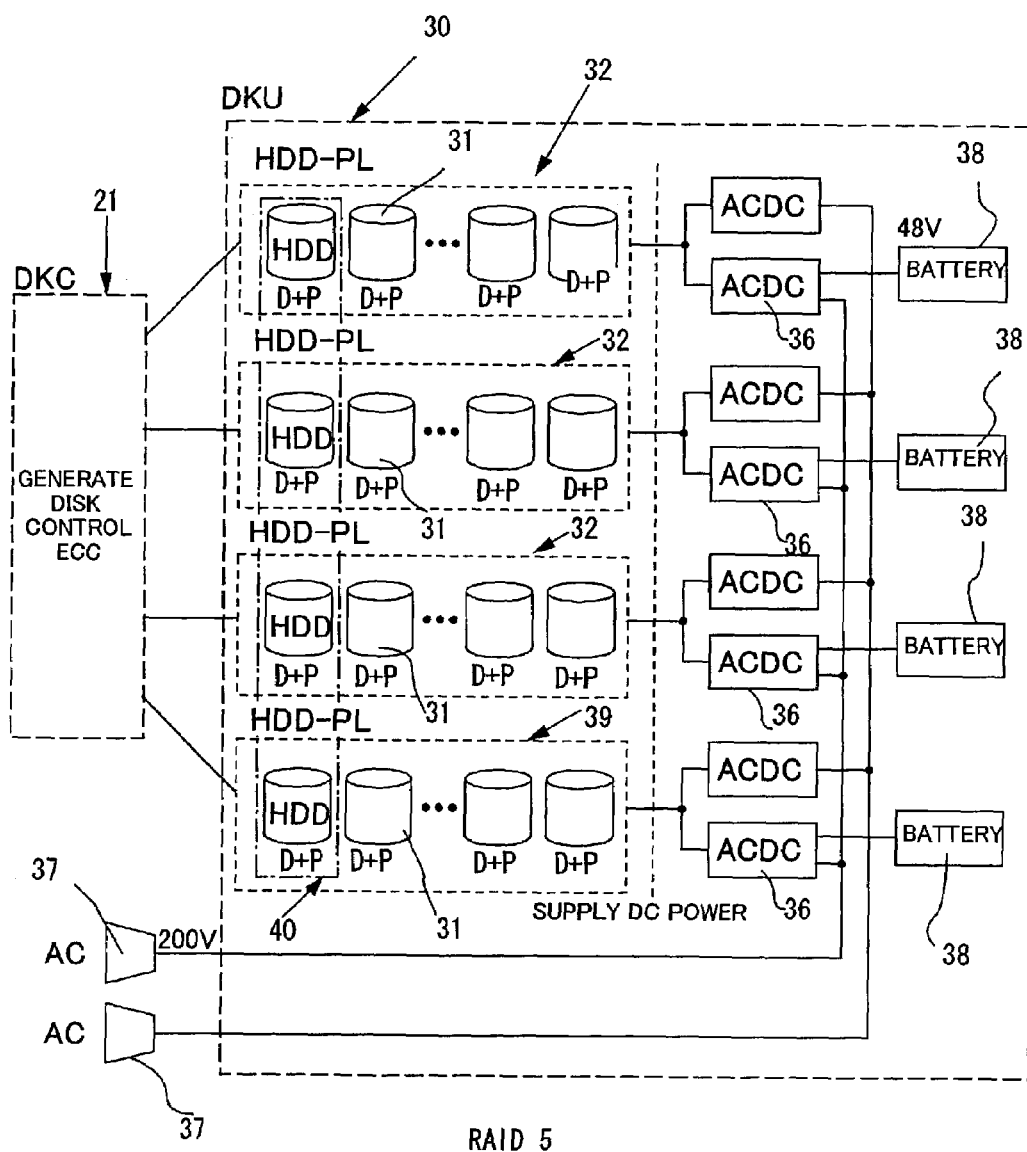

Referring to FIGS. 3B to 3D, the present invention may be applied to disk array devices of various RAID levels. FIG. 3B shows an example of simple mirroring construction (RAID1) which dispenses with parity bits for error correction. FIG. 3C shows an exemplary construction in which a disk drive for parity bits are provided for each disk unit. (RAID3/4). In this figure, the disk unit 39 contains parity bits for error correction. As shown with an alternate long and short dash line, an error correction group 40 is configured across the plurality of disk units 32, 39, each of which being provided with AC/DC converters 36 and a backup battery 38. Even if either one of the disk units 32, 39 suffers a power failure, the data in the error correction group 40 can be recovered by the remaining operative disk units. FIG. 3D shows an exemplary construction of distributed data guarding (RAID5) in which parity data is stored in each disk drive in each disk unit in distributed manner. In this construction, as described in relation to FIG. 3C, an error correction group 40 is also arranged across the plurality of disk units. Thus, data protection against a power failure in either disk unit is enhanced for each error correction group 40.

It should be noted that the ratio of the number of the disk units for data and the number of the disk units for parity bits in a disk subsystem may be arbitrarily chosen as required. In these cases, a backup power supply may be provided for each disk unit.

In the meantime, the disk unit for data and the disk unit for parity bits are not required to be installed in a single disk subsystem. That is, the disk unit for data and the disk unit for parity bits may be installed in multiple different disk subsystems separately, and a backup power supply may be provided for each disk unit.

In an additional embodiment, multiple disk subsystems are divided into a group for storing data and a group for storing parity bits, a backup power supply may be provided for each subsystem group.

Figure 4:
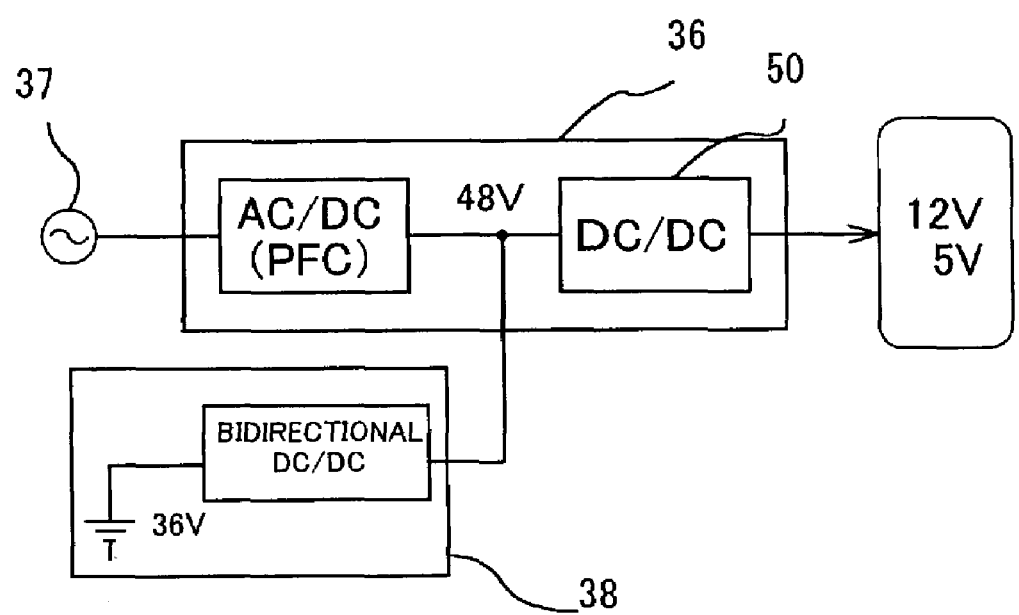
FIG. 4 is a schematic diagram of an AC/DC converter circuit construction of a power backup system according to one embodiment of the present invention.

In the present embodiment, AC power is supplied to the AC/DC converter 36 of each platter 32 from the AC power supply box 37 which is provided with AC power from two independent systems such as commercial power source or a UPS. Each AC/DC converter 36 converts AC power into DC power of suitable current and voltage and supplies the DC power to each platter 32 to which it is connected. Meanwhile, the DC output from the AC/DC converter 36 is supplied to the battery 38 to charge the same. FIG. 4 illustrates the schematic power circuit. The AC/DC converter 36 converts AC 200V from the AC power supply box 37 into DC48V for example, while attempting improvement of power factor, further stepped down to the voltage required at the platter 32, actually the disk drive 31 and the other devices contained therein, for example 12V and/or 5V. The aforesaid DC48V may be applied to charging if the battery 38 is not sufficiently charged.

When the AC power supply box 37 is down or the AC power supply is discontinued due to continuous or instantaneous power failure, or the AC voltage becomes lower than required, such a situation arises that the power of DC48V is unable to be supplied or is not sufficient. In this case, the voltage of the battery 38, DC36V becomes relatively higher than the voltage of the power source, and the power flows into the DC-DC converter 50 of the AC/DC converter 36 from the battery 38. Through this sequence, power backup by the battery 38 is accomplished in a quick and efficient manner in response to failure in AC power. Moreover, this power backup is performed for each platter 32 separately to each other, thus is not affected by the power supply systems for the other platters 32. In summary, since power backup is provided for each of the platters 32 and the respective power backup system are independent to each other, this means RAID philosophy for a disk array device has been successfully enhanced to power backup system.

So as to accomplish the aforesaid and other objects, according to another embodiment of the present invention, an AC/DC converter may be provided for each disk unit which is connected to both the AC power source and the battery, to supply power via the AC/DC converter.

Further, the batteries for each disk unit may be stacked.

Moreover, in the aforesaid power backup method for a disk array device, at least a battery is equipped with from among the batteries and the AC/DC converter.

SECOND EMBODIMENT OF THE INVENTION

The second embodiment of the present invention will be described hereinbelow with referring to the accompanying drawings.

Figure 5:
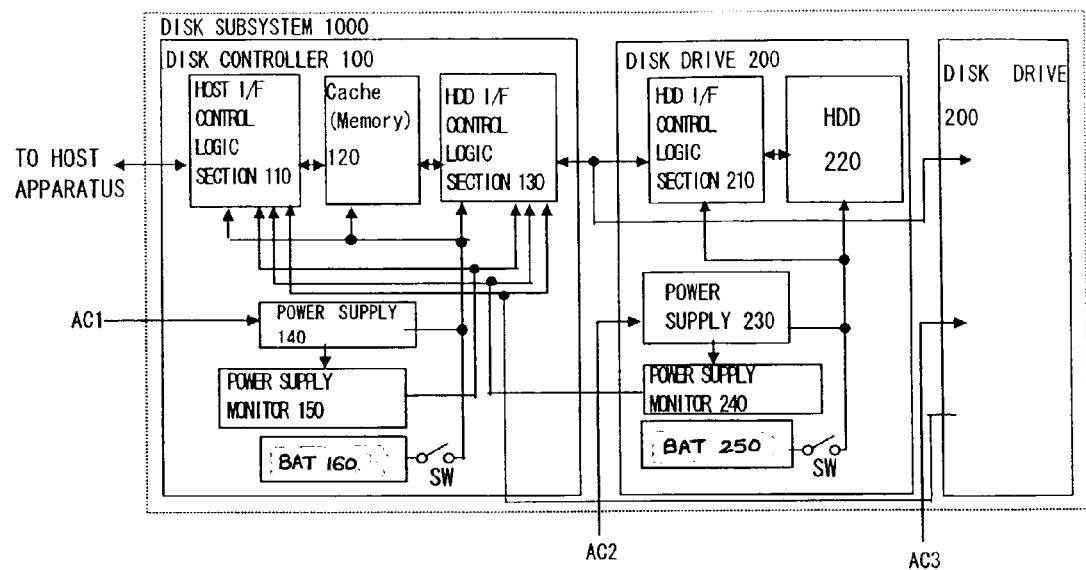
FIG. 5 is a block diagram of another embodiment of the present invention.

As shown in FIG. 5, a disk array device 1000 (or a storage device, a disk subsystem) comprises a disk controller 100 and one or a plurality of disk drives 200. The disk controller 100 controls entire operation of the disk array device 1000. The disk controller 100 accepts request for data transfer from a host apparatus or requests a host apparatus to transmit and receive the data. The disk drive 200 including an HDD (Hard Disk Drive) writes/reads data to/from the HDD under control of the disk controller 100. The disk drive 200 may be equipped additionally as required so as to expand storage capacity of the disk array device 1000.

The disk controller 100 will be described hereinbelow. The disk controller 100 is comprised of a board containing electronic components for implementing its control functions. Among the electronic components are there a peripheral circuit including a microprocessor, a RAM, a cache memory, a ROM for storing a program for implementing required functions, and dedicated circuits and chips for various functions. As shown in FIG. 5, the disk controller 100 comprises a host interface control logic section 110, a cache memory 120, an interface control logic section 130 of the HDD as well as a power supply 140, a power supply monitor 150, and a backup battery (auxiliary power source for backup) 160.

The host control logic section 110 implementing interface with a host apparatus carries out processing such as accepting request for data transfer. The cache memory 120 temporarily stores data to be written to the disk drive 200 which was transferred from the host apparatus. The interface control logic section 130 of the HDD carries out interface with the HDD in transmitting/receiving data, i.e., writing data to/reading data from the HDD.

The power supply 140 generates DC output as required from independent AC input AC1 for the disk controller 100 to supply operational power to the host interface control logic section 110, the cache memory 120, and the interface control logic section 130. To the backup battery 160 is connected a power supply path to the host interface control logic section 110, the cache memory 120, and the interface control logic section 130. A switch SW is inserted into the power supply path for opening/closing the same which is in turn opened/closed by a selecting signal from the power supply monitor.

The power supply monitor 150 monitors DC output condition from the power supply 40, and notifies the host interface control logic section 110 and the interface control logic section 130 of the HDD of the monitoring result. When the power supply monitor 150 detects abnormality in power supply, the monitor 150 sends the selecting signal to the switch SW so that operational power is supplied to various sections from the backup battery 160.

Next, the disk drive 200 will be described hereinbelow. As shown in FIG. 5, each disk drive 200 is provided with a power supply monitor 240. Namely, each disk drive 200 comprises an interface control logic section 210 of an HDD, a HDD 220, a power supply 230, the power supply monitor 240, and a backup battery (backup auxiliary power supply) 250. The interface control logic section 210 transmits/receives data through the interface control logic section 130 of the HDD at the disk controller 100 side. The power supply 230 generates DC output as required from independent AC input AC2 or AC3 for each disk drive 200 to supply operational power to the host interface control logic section 210 of the HDD and the HDD 220. To the backup battery 250 is connected a power supply path to the host interface control logic section 210 of the HDD and the HDD 220. A switch SW is inserted into the power supply path for opening/closing the same which is in turn opened/closed by a selecting signal from the power supply monitor 240.

When an output voltage of the power supply 230 is determined normal, each power supply monitor 240 sends a selecting signal to the switch SW so that operational power from the power supply 230 is distributed to various sections. When the power supply monitor 240 detects abnormality in output voltage of the power supply 230, the monitor 240 sends the selecting signal to the switch SW so that operational power is supplied to various sections from the backup battery 250. When either of the power supply monitors 240 detects power failure such that power has been lost for over 1 minute for example, the monitor 240 notifies the host interface control logic section 110 in the disk controller 100 and the interface control logic section 130 of the HDD of the event. The interface control logic section 130 of the HDD, which was notified by the power supply monitor 240 at the disk drive 200, writes the data temporarily stored in the cache memory 120 into the HDD 220 in the disk drive 200 while each section of the disk drive 200 is supplied with operational power from the backup battery 250. By means of this operation so called "destaging," reliability of data is ensured even if the AC input AC2 and/or AC3 is lost.

Typical configuration of the power supply of the disk controller 100 and the disk drive 200 may be an AC/DC power supply or a combination of an AC/DC power supply and a DC stabilized power supply (DC-DC converter), which outputs predetermined voltage such as DC12V or 5V. One example of the AC/DC power supply is such a well-known one as described in a distributed publication such as "Transistor Technology Special No. 28, 2nd Edition," p.7 FIG. 1, CQ Publishing Co. Ltd., Jan. 20, 1993. As the DC stabilized power supply, a well-known regulator may be employed such as a step-down type DC-DC converter, for example, various types of power supply as illustrated in "Transistor Technology Special No. 28, 2nd Edition," p.4 FIGS. 4–6, CQ Publishing Co. Ltd., Jan. 20, 1993.

Figure 6:
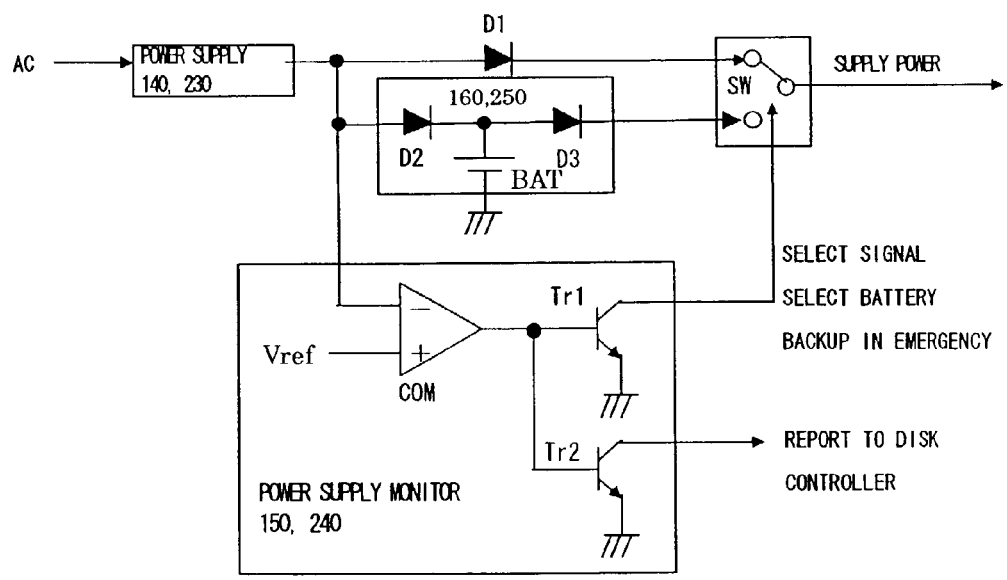
FIG. 6 is a block diagram of a power supply system according to yet another embodiment of the present invention.

The backup battery 160, 250 of the disk controller 100 and the disk drive 200 is comprised of a secondary battery such as a lead-acid battery and the like. As shown in FIG. 6, an output voltage of a secondary battery BAT is supplied to the switch SW side through a backflow prevention diode D3. For the backup battery 160, 250 may be employed a variety of alternative devices if only it is an auxiliary power supply which is able to function as an UPS without limited to secondary batteries.

Furthermore, a specific circuit construction of the power supply monitor 150, 240 of the disk controller 100 and the disk drive 200 may be configured including predefined logic circuits as shown in FIG. 6, so that an output voltage of the power supply is monitored to determine if it is normal or not to notify the disk controller 100 of the monitoring result and transmit a selecting signal to the switch SW. The determination section of the monitored voltage may employ a comparator COM. To the input terminals of the comparator COM are inputted a predetermined reference voltage Vref and an output voltage of the power supply at its positive and negative terminals respectively. The output of the comparator COM is inversed when the output voltage of the power supply goes low beyond the reference voltage Vref. The inversed output turns on Transistors Tr1 and Tr2. According to the collector signal of the turned on transistor Tr1, the selecting signal is sent to the switch SW to supply operational power to the various sections from the backup battery. Meanwhile, according to the collector signal of the turned on transistor Tr2, abnormality of the power supply is notified to the disk controller 100.

Figure 7:
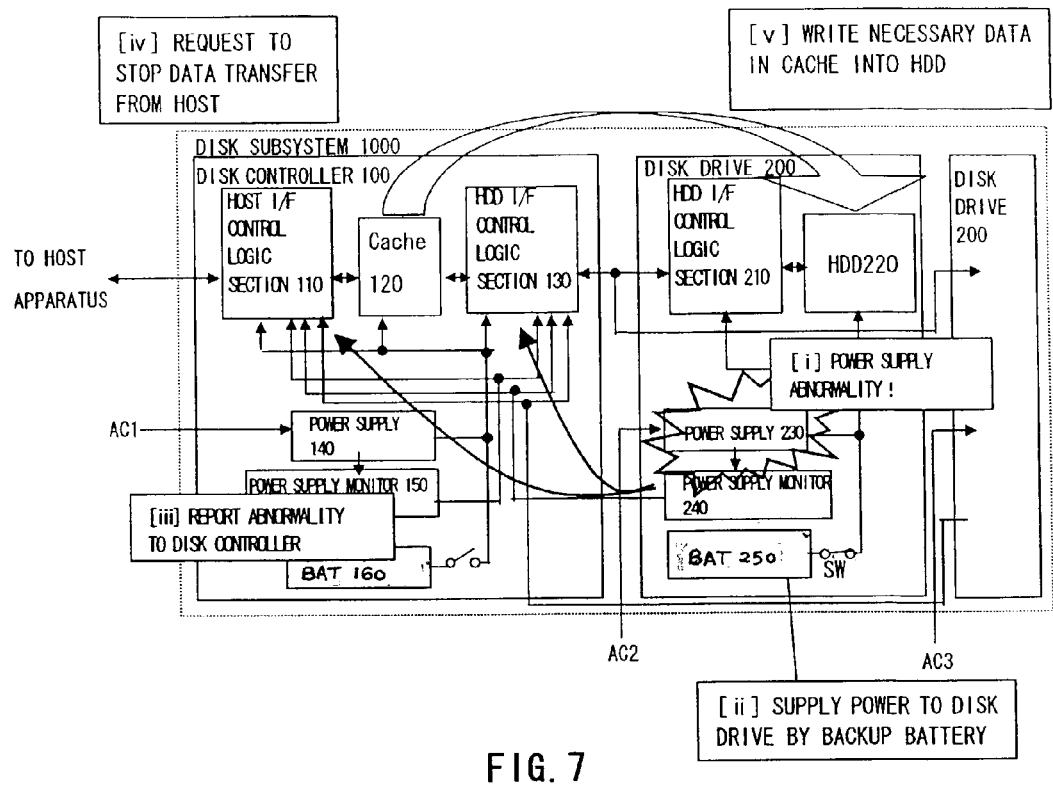
FIG. 7 is a block diagram in which a power failure has occurred to a disk drive in yet another embodiment of the present invention.

An operation for a power failure at the disk drive 200 will be described more specifically referring to a block diagram in FIG. 7. When the power supply monitor 240 of the disk drive 200 detects a fault of the power supply 230 as indicated by [i] in FIG. 7, operational power is distributed to the various sections from the backup battery 250. See [ii] in the figure. At the same time, the power supply monitor 240 of the disk drive 200 notifies the host interface control logic section 110 of the disk controller 100 and the interface control logic section 130 of the HDD of the monitoring result as shown by [iii] in FIG. 7. The host interface control logic section 110 thus notified requests a host apparatus to stop data transfer to the disk drive 200 to which a power failure occurred. See [iv] in the figure. In response to this operation, the disk controller 100 stops accepting the request for data transfer to the disk drive 200 to which a failure occurred. If the data directed to the disk drive of power failure is already written into the cache memory 120, the data is read from the cache 120 and written into the HDD 220 of the disk drive 200 of power failure. (Destaging, See [v] in the figure.)

The above configuration enables the disk controller 100 to receive a notification of power failure from the power supply monitor 240 of the disk drive 200. Thus, in the entire disk array device 1000, the disk drive 200 with power failure is able to be definitely recognized as a part to be excluded from operation. The disk controller 100 requests a host apparatus to stop data transfer to the disk drive 200 with power failure and enables to stop the data transfer from the host apparatus. This leads to improvement of reliability in data transfer. Further, even when the power supply for the disk drive 200 has gone into abnormal state, the backup battery 250 supplies operational power to the disk drive 200. This makes it possible to normally write the data already written into the cache memory 120 of the disk controller 100 into the HDD 220. Thus, the data up to an instance immediately before occurrence of power failure is able to be protected and reliability in data transfer can be improved. Moreover, the power required to write the maximum amount of data to be cached in the cache memory 120 into the HDD 220 of the disk drive 200 is able to be defined as appropriate capacity of the backup battery 250.

Figure 8:
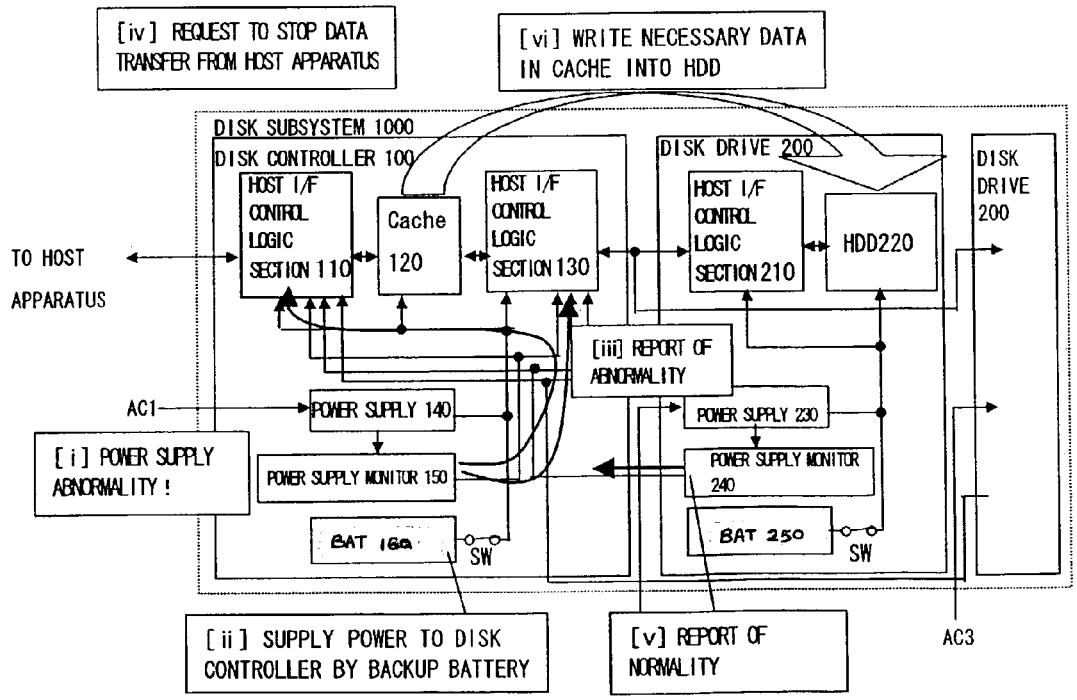
FIG. 8 is a block diagram in which a power failure has occurred to a disk controller in yet another embodiment of the present invention.

Operation of the present embodiment when power failure has occurred to the disk controller will be described referring to a block diagram in FIG. 8. When the power supply monitor 150 of the disk controller 100 detects a fault ([i] in FIG. 8), operational power is supplied to the various sections from the backup battery 160. See [ii] in the figure. The power supply monitor 150 of the disk controller 100 also notifies the host interface control logic section 110 of the disk controller 100 and the interface control logic section 130 of the monitoring result. ([iii] in FIG. 8) The host interface control logic section 110 notified of power failure by the power supply monitor 150 requests the host apparatus to stop data transfer. ([iv] in FIG. 8) When the logic section 110 is notified of power failure from the power supply monitor 150, the logic section 110 requests the host apparatus to stop data transfer. ([iv] in FIG. 8) The logic section 110 detects the disk driver 200 that the corresponding power supply monitor 240 recognizes and notifies normal condition ([v] in FIG. 8), and writes the data already stored in the cache memory 120 into the HDD 220 of the normal disk drive 200 with no power failure. See [vi] in FIG. 8.

Since each disk drive 200 is provided with the power supply monitor 240, the disk drive 200 in normal operation can be determined. Thus, even if power failure occurs to the disk controller 100, the backup battery 160 supplies operational power to the disk controller 100 and the data already written in the cache memory 120 of the disk controller 100 can be written into the HDD 220 of the normal disk drive 200. Thus, the data up to an instance immediately before occurrence of power failure is able to be protected and reliability in data transfer can be improved.

Figure 9:
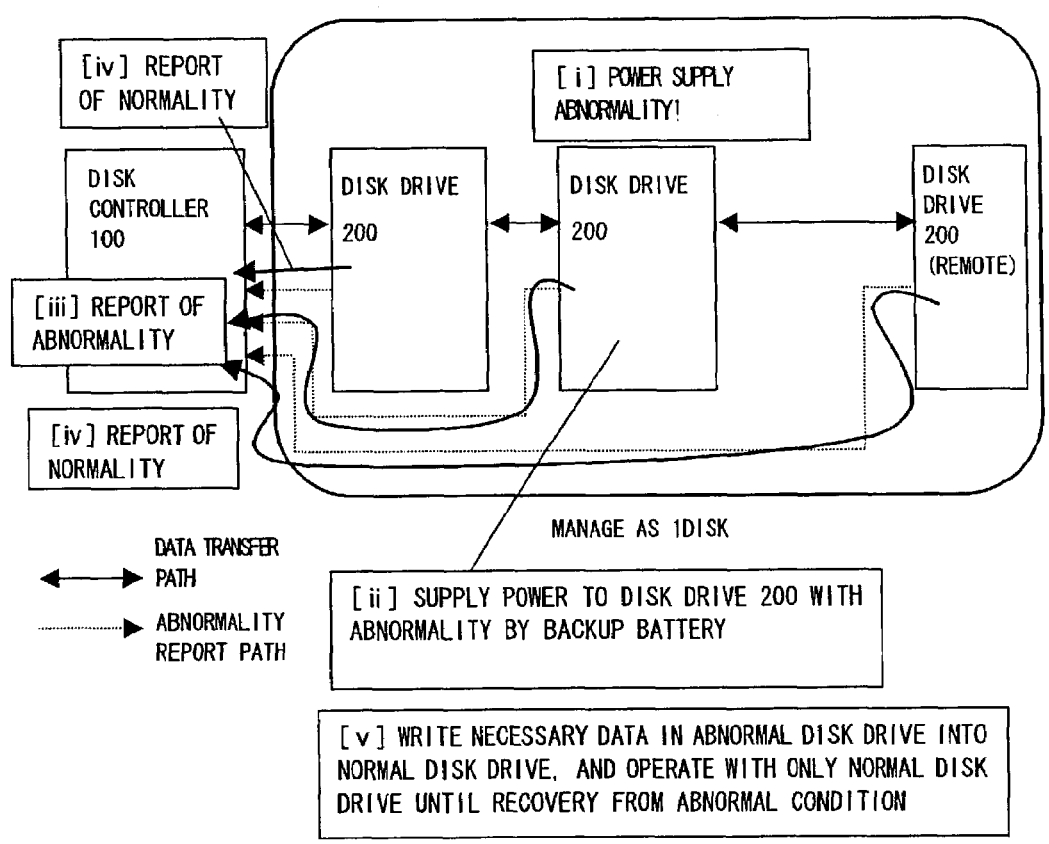
FIG. 9 shows an example of virtualization of a disk array device according to yet another embodiment of the present invention.

An example of application of the present invention to virtualization of the disk array device will be described referring to a block diagram of FIG. 9 and FIG. 1 as mentioned above. As shown in FIG. 9, the present invention is applied to administration and operation of a plurality of disk drives 200 as one virtual disk drive, for example. The disk drives 200 may be located remotely to each other. In the case that power failure has occurred to one of the disk drives 200, as shown in FIG. 9 and FIG. 1, when the power supply monitor 240 of the above disk drive 200 detects a fault of the power supply 230 ([i] in FIG. 9), operational power is supplied to the various sections from the backup battery 250 ([ii] in FIG. 9). The power supply monitor 240 of the disk drive 200 also notifies the host interface control logic section 110 of the disk controller 100 and the interface control logic section 130 of the HDD of the monitoring result. ([iii] in FIG. 9) If the data directed to the disk drive 200 with power failure was already written into the cache memory 120 of the disk controller 100, the logic section 110 of the disk controller 100 which was notified of the power failure by the monitor 240 reads the data from the cache memory 120 and writes it into the HDD 220 in the other normal disk drive 200 ([v] in FIG. 9). The disk controller 100 continues operation utilizing the other normal disk drives 200 until recovery from the power failure ([v] in FIG. 9). The other disk drives 200 with no power failure including those remotely located notify the disk controller 100 of their normal operation. ([iv] in FIG. 9) Since the power supply monitor equipped with each disk drive 200 operates accordingly, the disk array device as a whole is able to maintain normal operation.

Thus, even if partial power failure occurs, such processes as writing/reading data can be performed using the disk drives 200 in normal operation.

Figure 10A:
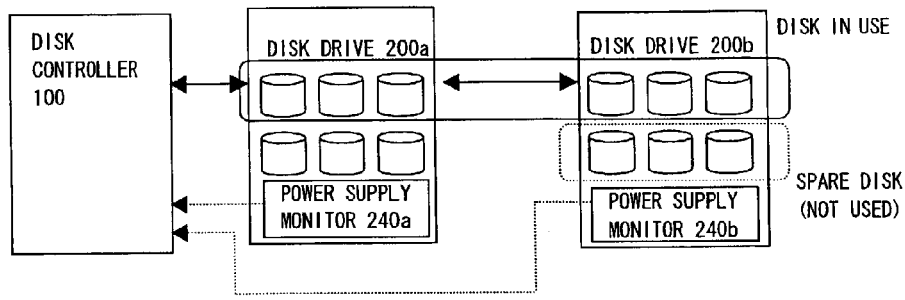
FIG. 10A shows a normal condition and FIG. 10B shows a power failure condition.
Figure 10B:
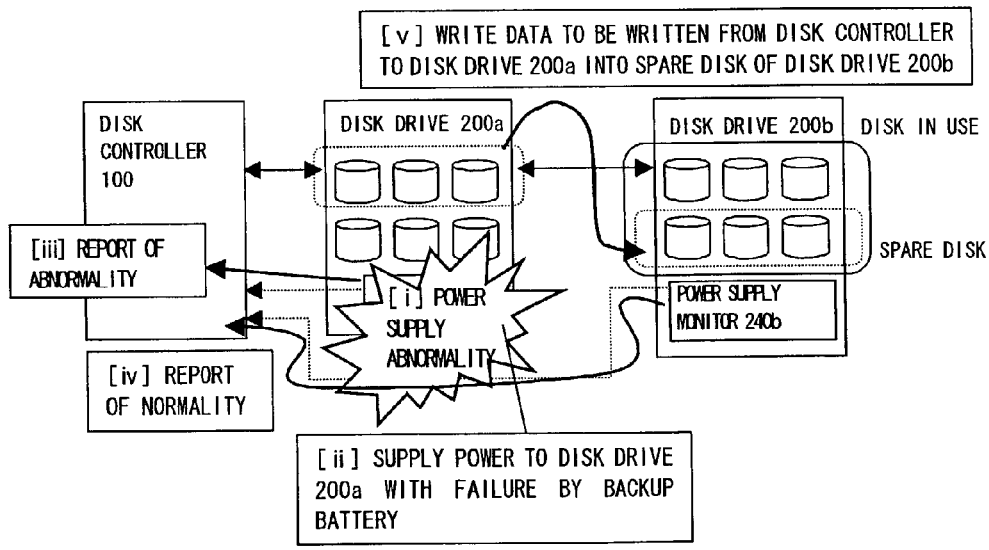

Data guarantee using spare disks will be described referring to FIGS. 10A and 10B and FIG. 1 mentioned above. In the present embodiment, as shown in FIGS. 10A, 10B, the power supply monitors 240a, 240b of the respective disk drives 200a and 200b monitor the condition of power supplying to report it to the disk controller 100. The disk controller 100 performs countermeasures against power failure such as saving the data in response to the report. As shown in the block diagram in FIG. 10B, it becomes possible to write the data to be written into the disk drive 200a with power failure originally into the spare disks in a different disk drive 200b.

More specifically, as shown in FIGS. 10A and 10B and FIG. 1, when the power supply monitor 240 of the disk drive 200 detects failure of the power supply 230 ([i] in FIG. 10B), operational power is distributed to the various sections from the backup battery 250 ([ii] in FIG. 10B). The power supply monitor 240 of the disk drive 200 reports the monitoring result to the host interface control logic section 110 of the disk controller 100 and the interface control logic section 130 of the HDD ([iii] in FIG. 10B). If the data directed to the disk drive 200 with power failure is already stored in the cache memory 120 of the disk controller 100, the logic section 110 of the disk controller 100 which was notified of power failure from the monitor 240 of the disk drive 200 reads the data from the cache memory 120 and writes the data into a spare disk in the other disk drive 200b ([iv] in FIG. 10B). The disk controller 100 continues its operation using spare disks in a normal disk drive 200b until recovery from the power failure ([v] in FIG. 10B). On the other hand, the disk drives 200 including those located remotely which do not suffer from the power failure notifies the disk controller 100 of their normal operation ([iv] in FIG. 10B).

Figure 11:
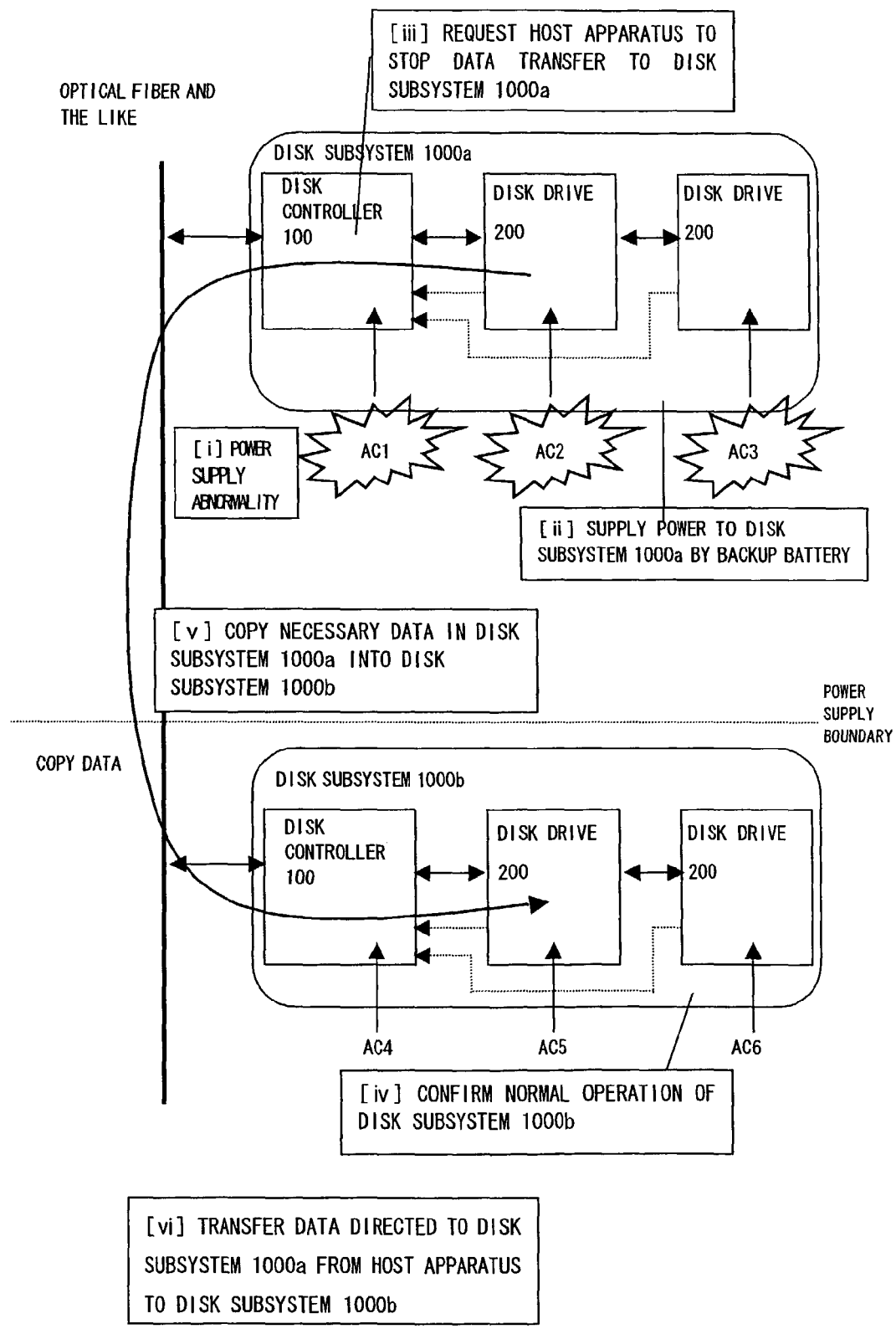
FIG. 11 is a block diagram illustrating a situation in which a destination of copying a backup of data is a different disk array device.
Figure 12:
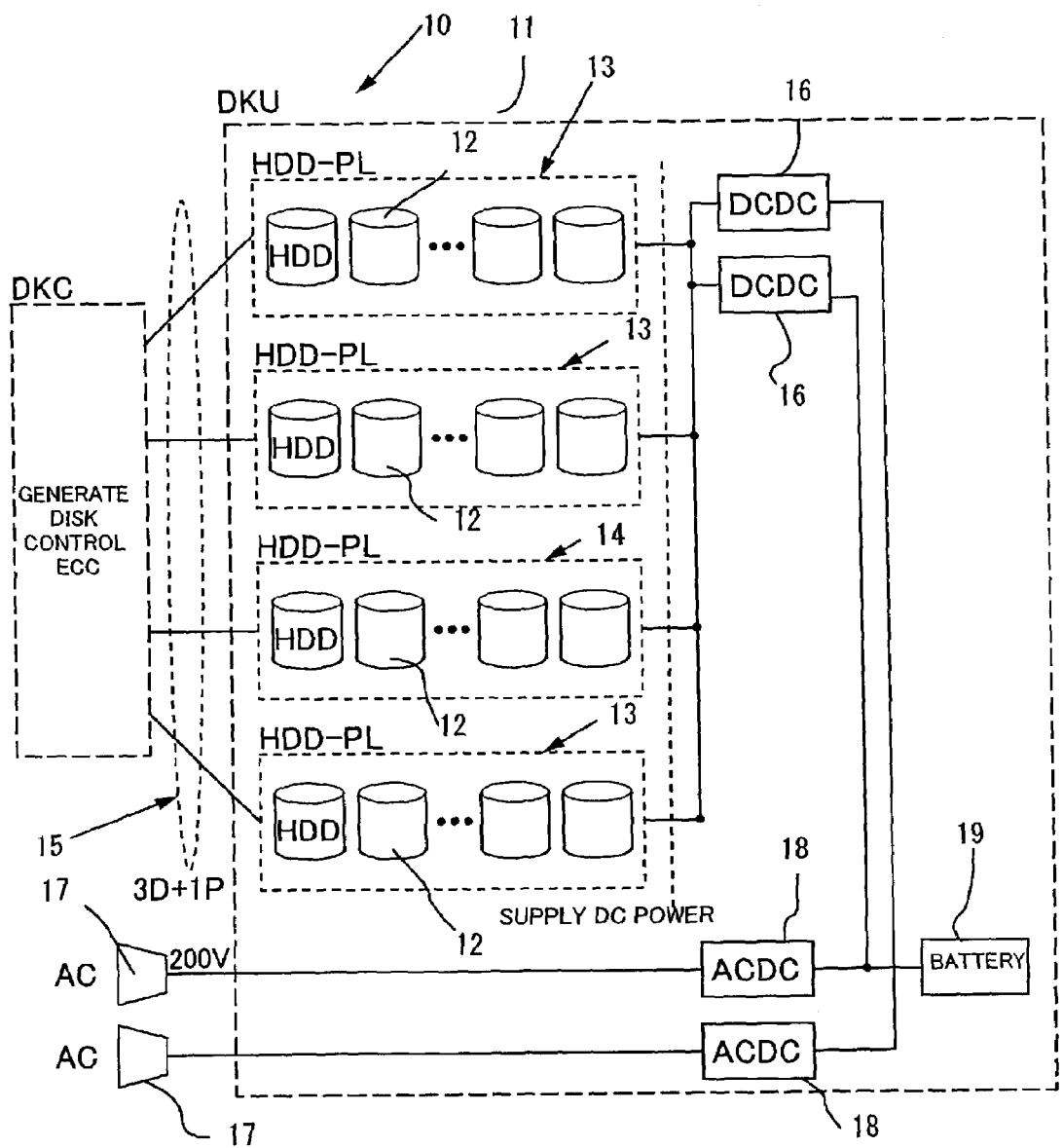
FIGS. 12 and 13 illustrate a typical configuration for supplying power to an existing disk array device.
Figure 13:
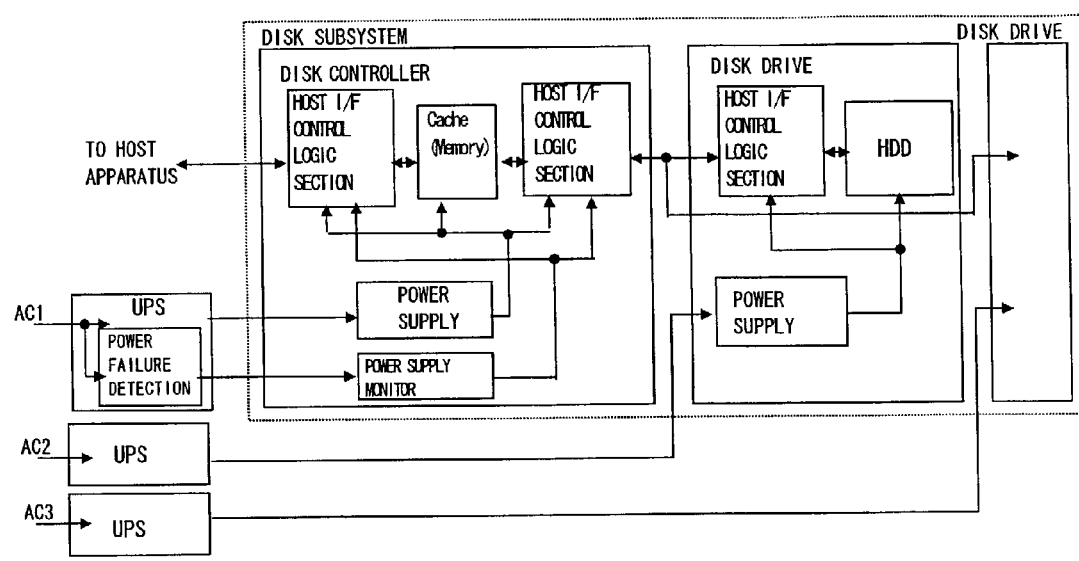

Turning now to FIG. 11, a plurality of disk array devices which are referred to as a "disk subsystem," 1000a, 1000b are supplied with power respectively from AC inputs, the distribution switchboards of which being separated to each other, i.e., AC inputs belonging to the different power systems divided by a power source boundary respectively. The data is remotecopied between the disk array devices 1000a, 1000b which are connected to the power sources separate to each other respectively, or is simultaneously written in to the disk array devices 1000a and 1000b for "mirroring." Since the data is remotecopied to the device 1000b or is written into the device 1000b simultaneously, the data can be protected even if the disk array device 1000a goes down due to power failure.

More specifically, as shown in FIG. 11 and FIG. 1, when the power supply monitor 150 of the disk controller 100 or the power supply monitor 240 of the disk drive 200 detects a failure of the power supply 140 in the disk array device 1000a ([i] in FIG. 11), operational power is supplied to the various sections from the backup battery 160, 250 ([ii] in FIG. 11). The power supply monitor 150 of the disk controller 100 or the power supply monitor 240 of the disk drive 200 reports the monitoring result to the host interface control logic section 110 of the disk controller 100 or the interface control logic section 130 of the HDD in the disk array device 1000a. When the host interface control logic section 110 is notified of the power failure from the power supply monitor 150 in the disk array device 1000a, the logic section 110 requests the host apparatus to stop data transfer and to change the objective device for reading/writing data from the disk array device 1000a to the device 1000b ([iii] in FIG. 11). The disk controller 100 of the disk array device 1000a acknowledges that each of the power supply monitors 150, 240 of the disk array device 1000b have reported normal operation ([iv] in FIG. 11). The disk controller 100 of the disk array device 1000a which acknowledged normality has necessary data in the disk array device 1000a copied to the normal disk array device 1000b ([v] in FIG. 11). Accordingly, the host apparatus changes the objective device for reading/writing data from the original disk array device 1000a to the device 1000b ([vi] in FIG. 11).

According to the preferred embodiments of the present invention, the following effects can be accomplished.

Since the disk controller is capable of receiving a report regarding failure from the power supply monitor of the disk drive, the disk drive having power failure can be identified to be a section in which operation should be stopped in the entire disk array device. Thus, the disk controller is capable of requesting the host apparatus to stop data transfer to the disk drive with power failure to stop the data transfer. Accordingly, improvement of reliability in data transfer is accomplished.

Since the data already stored in the cache memory of the disk controller is able to be normally written into the HDD of the disk drive to which power failure has not occurred, reliability in data transfer can be improved.

Further, a proper capacity of the backup power supply may be defined as the power required for writing the maximum data storable in the cache memory into the HDD of the disk drive.

Providing the power supply monitor to each of the disk drives enables identification of the disk drives capable of normal operation. Thus, even if power failure has occurred to the disk controller, it is possible to write the data already stored in the cache memory into the HDD of the normal disk drive and reliability in data transfer is improved.

It is possible to provide a method of power backup for disk array devices which is cost-effective and suitable for downsizing, and also achieves fault tolerance in power supplying, thus reliability of disk array devices is improved.

Although the preferred embodiments of the present invention has been described in detail, it should be understood that various changes, substitutions and alterations can be made therein without departing from spirit and scope of the inventions as defined by the appended claims.

What is claimed is:

1. A disk array device having two or more disk units, each disk unit including at least one disk drive, at least one of said disk units having parity bits carrying data recovery information, comprising:
   a plurality of power supplies; and
   a plurality of backup batteries;
   wherein at least one of said power supplies and at least one of said backup batteries are provided for each of said disk units; and
   wherein when a power failure occurs, ordinary data is stored in said disk unit instead of said parity bits.

2. A disk array device as recited in claim 1, wherein a capacity of said backup battery provided for each said disk unit is defined according to a power source capacity required for each said disk unit.

3. A power backup system for a disk array device, said disk array device including an error correction group containing a disk unit storing data and a disk unit storing parity bits carrying data recovery information for said disk unit, said disk unit having at least one disk drive, the power backup system comprising:

a plurality of power supplies; and a plurality of backup batteries;

wherein at least one of said power supplies and at least one of said backup batteries are provided for each said disk unit, a capacity of which is determined according to required power for each said disk unit; and wherein when a power failure occurs, ordinary data is stored in said disk unit instead of said parity bits.

4. A power backup system as recited in claim 3, wherein said disk units constructing said error correction group are installed in multiple disk array devices separately.

5. A power backup system as recited in claim 3, further comprising an AC/DC converter provided for each said disk unit, said AC/DC converter connected to an AC power source and said backup battery wherein power is supplied to said disk unit through said AC/DC converter.

6. A power backup system as recited in claim 3, wherein said backup batteries for said respective disk units are stacked.

7. A power backup system as recited in claim 5, wherein at least a backup battery is provided from among said backup battery and said AC/DC converter.

8. A disk array device comprising:

a disk controller configured to accept a request for data transfer from a host apparatus and transmit and receive data;

a disk drive writing and reading data under control of said disk controller;

a first power supply monitor provided for said disk controller;

a second power supply monitor provided for said disk drive;

a first backup power supply provided for said disk controller, a second backup power supply provided for said disk drive;

wherein said second power supply monitor provided for said disk drive is connected to said disk controller to have a monitoring result from said second power supply monitor provided for said disk drive received by said disk controller; and wherein operational power is supplied to said disk controller and said disk drive from said second backup power supply according to a monitoring result of said second power supply monitor.

9. A disk array device as recited in claim 8, comprising a plurality of power supplies converting an AC input into predetermined DC output;

wherein a first said power supply is provided for said disk controller and a second said power supply is provided for each said disk drive;

wherein said first power supply is monitored by said first power supply monitor and said second power supply is monitored by said second power supply monitor.

10. A disk array device as recited in claim 8, wherein when said disk controller is reported of a power failure from said second power supply monitor provided for said disk drive, said disk controller requests said host apparatus to stop data transfer to said disk drive in which the failure has occurred.

11. A disk array device as recited in claim 10, wherein if the data directed to said disk drive in which a power failure has occurred is already stored in a cache memory of said disk controller, said disk controller reads said data from said cache memory and writes said data into said disk drive with said power failure while operational power is supplied to said disk drive with said power failure from said second backup power supply.

12. A disk array device as recited in claim 8, wherein when said disk controller is reported of a failure from said first power supply monitor provided for said disk controller, said disk controller requests said host apparatus to stop data transfer.

13. A disk array device as recited in claim 12, wherein said disk controller reads the data already stored in a cache memory of said disk controller from said cache memory and writes the data into said disk drive without power failure.

14. A method of controlling a disk array device including a disk controller accepting data transfer request from a host apparatus to transmit/receive the data, and a disk drive writing/reading data under control of said disk controller, said disk controller having a first power supply monitor and a first backup power supply and said disk drive having a second power supply monitor and a second backup power supply, the method comprising:

receiving a monitoring result from said second power supply monitor of said disk drive;

supplying operational power from said second backup power supply to said disk drive according to the monitoring result received from said second power supply monitor; and acquiring the monitoring result of said second power supply monitor of said disk drive by said disk controller.

15. A method of controlling a disk array device as recited in claim 14, further comprising providing a power supply converting an AC input into predetermined DC output for said disk controller and each said disk drive which is monitored by said first and second power supply monitors.

16. A method of controlling a disk array device as recited in claim 14, further comprising when said disk controller is reported of a power failure from said second power supply monitor of said disk drive, requesting said host apparatus to stop data transfer to said disk drive in which the failure has occurred.

17. A method of controlling a disk array device as recited in claim 16, further comprising, if the data directed to said disk drive in which a power failure has occurred is already stored in a cache memory of said disk controller, reading said data from said cache memory and writing said data into said disk drive with said power failure while operational power is supplied to said disk drive with said power failure from said second backup power supply.

18. A method of controlling a disk array device as recited in claim 14, further comprising, when said disk controller is reported of a failure from said first power supply monitor of said disk controller, requesting said host apparatus to stop data transfer.

19. A method of controlling a disk array device as recited in claim 18, further comprising reading the data already stored in a cache memory of said disk controller from said cache memory and writing said data into said disk drive without power failure.

* * * * *